Patented Dec. 28, 1948

2,457,657

UNITED STATES PATENT OFFICE 2,457,657

POLYMERIZABLE COMPOSITION

Sanford E. Glick, Springfield, Mass., assignor to Monsanto Chemical Company, St. Louis, Mo., a corporation of Delaware No Drawing. Application November 4, 1944,
Serial No. 562,035

2 Claims. (Cl. 260—22)

1

This invention relates to a new composition of matter and to materials impregnated therewith.

It is an object of this invention to provide a new polymerizable composition of matter. Another object is to provide a polymerizable composition for impregnating porous materials. A particular object is to render porous metal castings impervious.

These and other objects are accomplished by the following invention which comprises incorporating styrene with a polyester comprising the residues of a glycol having 2–6 carbon atoms, a dicarboxylic aliphatic acid having ethylenic unsaturation and not over 8 carbon atoms and a long chain monocarboxylic aliphatic acid free from conjugated unsaturated groups, to form a polymerizable composition particularly suitable for sealing porous materials such as magnesium and aluminum castings.

The following are examples illustrative of the present invention but not limitative thereof. Where parts are given they are parts by weight.

EXAMPLE I

A mixture of 350 parts of diethylene glycol, 235 parts of maleic anhydride and 0.9 part of paratoluene sulphonic acid monohydrate is heated up to 190–195° C. over a period of ½–1 hour and maintained at 190–195° C. until the acid number (KOH equivalent in milligrams per gram of the reaction mixture) is reduced to 3–15. Thereafter, 415 parts of linseed oil fatty acids, are added and the heating continued at 190–205° C. until the acid number is reduced to 5–20. The reaction is carried out under an air condenser permitting escape of evolved water, while stirring and passing carbon dioxide gas through the reaction mixture. The product is a clear, resinous liquid having a viscosity of 15–20 poises at 25° C. (Gardner-Holdt viscosimeter).

EXAMPLE II

A mixture of 183 parts of ethylene glycol, 667 parts of soybean oil and 0.3 part of litharge is heated at 190–195° C. until one volume of the reaction mixture is soluble in 6 volumes of methanol. 262 parts of maleic anhydride are then added and the mixture heated at 195° C. until an acid number of about 20 is obtained. The reaction is carried out as in Example I under an air condenser while stirring and passing carbon gas through the reaction mixture. The product is a clear, resinous liquid having a viscosity of 75–100 poises at 25° C.

EXAMPLE III

Example II is repeated except that 667 parts of cocoanut oil are substituted for the soybean oil. A product having similar properties is obtained.

EXAMPLE IV

Example II is repeated except that 667 parts of linseed oil are substituted for soybean oil. A product having similar properties is obtained.

Mixtures of the foregoing polyester resins with styrene may be copolymerized to form infusible, insoluble products. The following examples illustrate the preparation of such polymerizable mixtures and their use in sealing porous materials.

EXAMPLE V

Porous magnesium castings are placed in a vessel capable of being evacuated and are then subjected to an absolute pressure corresponding to 3 inches of mercury or less for about one-half hour. Thereafter while still maintaining the partial vacuum, a sufficient amount of a mixture of 75 parts styrene and 25 parts of the resin described in Example I is drawn in to cover the castings and then a pressure of 50–90 pounds per square inch (gauge) is applied for about one-half hour. The castings are removed from the pressure vessel and after removal of the excess impregnating composition by draining and then washing with a solvent for the impregnating composition, such as kerosene, toluene or the like, baked at 135° C. for about two hours under 75–95 pounds per square inch pressure followed by two hours at 150–175° C. in a circulating air oven. When desired the impregnating composition may be completely polymerized under pressure by extending the heating period in that operation. The impregnated castings are found to possess the outstanding properties characteristic of the products of this invention.

EXAMPLE VI

Example V is repeated except that a mixture of 30 parts of the resin described in Example I and 70 parts of styrene is used as the impregnant and porous aluminum castings are substituted for magnesium castings.

EXAMPLE VII

Example V is repeated except that a mixture of 50 parts of the resin described in Example I and 50 parts styrene is used as the impregnant and porous iron castings are substituted for magnesium castings.

EXAMPLE VIII

Example V is repeated except that a mixture of 70 parts of styrene and 30 parts of the polyester resin described in Example II is used to impregnate porous magnesium castings. The product is similar in properties to the product described in Example V.

The polyester resins described in Examples III and IV may be substituted for the polyester resin used in Example VIII to produce products having unexpected and valuable characteristics.

The impregnating compositions of this invention are found to possess an unexpectedly high sealing efficiency, particularly when applied to magnesium castings which usually present an unusually difficult sealing problem due to the extreme fineness of the porosity. For example, the sealed castings of this invention as illustrated by the examples resist the action of 100 octane gasoline, lubricating oil, ethylene glycol, liquid trichloroethylene, mineral spirts and the like.

Numerous variations may be introduced into the present invention as illustrated by the above examples. Thus, the reaction temperatures at which the resins described in Examples I and II are prepared may be substantially varied. In place of carbon dioxide gas other inert gases such as nitrogen may be passed through the reacting mixture. In place of toluene sulfonic acid in Example I, other catalysts may be used such as other sulfonic acids, e. g. benzene sulfonic acid, sulfuric acid, metallic oxides such as litharge, calcium oxide and the like. In place of litharge in Example II other metal oxides such as calcium oxide may be used. Under certain conditions the passage of inert gas and the inclusion of catalyst may be omitted, although it is preferred that the reaction conditions, e. g. temperature, pressure, nature and amount of catalyst, etc., be so correlated that a fusible product be obtained which has an acid number below 50 and, more particularly between 5 and 20 and a viscosity of 10–200 poises at 25° C. (Gardner-Holdt viscosimeter).

In place of maleic anhydride, dicarboxylic aliphatic acids generally which have ethylenic unsaturation and not over 8 carbon atoms or the anhydride thereof may be used. As examples of such acids may be mentioned maleic acid, fumaric acid, citraconic acid, mesaconic acid, methylethyl maleic acid, diethyl maleic acid, chlormethyl maleic acid, and the like. A particularly preferred group of acids or anhydrides comprise the compounds having the general formula

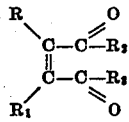

wherein R and $R_1$ are hydrogen, halogen, or alkyl groups having not over two carbon atoms and $R_2$ and $R_3$ are OH or $R_2$ and $R_3$ together stand for oxygen.

As examples of glycols having 2–6 carbon atoms, may be mentioned ethylene glycol, diethylene glycol, propylene glycols, such as 1,2- and 1,3-propanediol, butylene glycols, such as, 1,2-butanediol, 1,3-butanediol and 1,4-butanediol, and 1,4-butanediol, triethylene glycol and the like.

The long chain aliphatic acid may be used in the form of the free acid as in Example I or the corresponding glycerides may be used as in Examples II, III, and IV. As examples of long chain monocarboxylic aliphatic acids which may be used in the form of free acid or the glyceride thereof may be mentioned, saturated aliphatic acids such as decanoic acid, undecanoic acid, dodecanoic acid, triodecanoic acid, tetradecanoic acid, pentadecanoic acid, hexadecanoic acid, heptadecanoic acid, octadecanoic acid and nonodecanoic acid. These acids may have straight or branched chains or substituted chains, for example, substituted with halogen or hydroxyl groups, as for example, monochlor-octadecanoic acid, 12-hydroxy octadecanoic acid, and the like; unsaturated aliphatic acids, for example, monoolefinic-unsaturated aliphatic acids such as 7-hexadecenoic acid, 10-undecenoic acid, 9-octadecenoic acid; diolefinic-unsaturated aliphatic acids such as, 9, 12-octadecandienoic acid; triolefinic unsaturated aliphatic acids, such as, 9, 12, 15-octadecatrienoic acid; substituted olefinic acids, for example, such hydroxy acids as 16-hydroxy-7-hexadecenoic acid and 12-hydroxy-9-octadecenoic acid; halogenated acids, such as, for example, monochlor-9-octadecenoic acid, monochlor-12-hydroxy-9-octadecenoic acid and acids derived by dehydration of castor oil acids followed by chlorination. The long chain monocarboxylic aliphatic acid residues introduced into the polyester resins by reaction with the corresponding free acid or the glycerides thereof, contain 10 to 20 carbon atoms.

Mixtures of the foregoing saturated and/or unsaturated acids may be used, as for example, the mixed acids derived from such vegetable oils as linseed, castor, soybean, perilla, corn, cottonseed, sunflower, safflower, sesame, poppyseed, whale, dehydrated castor oils, palm kernel, cocoanut and the like and mixtures thereof.

Polyester resins made from the free long chain acids form a preferred class when low viscosity compositions are desired. Thus, polyester resins having a viscosity of 10–50 and more particulary 15–20 poises at 25° C. (Gardner-Holdt viscosimeter) are readily obtained when the free acids are used. When higher viscosities are desired, the corresponding glycerides are advantageously used, by employing such a procedure as that given in Example II. Thus, polyesters having a viscosity of 50–200 poises are readily obtained when the long chain acid glycerides are used.

In general, the amount of glycol employed is such that the hydroxyl groups present in the glycol substantially balance the carboxyl groups in the acid components. However, a small excess of glycol e. g. a 5–10% excess facilitates the preparation of a product having a low acid number without adversely affecting the characteristics of the product.

In general, the polymerizable composition comprises 10–70 parts of the polyhydric alcohol—polycarboxylic acid resin for every 90–30 parts of styrene and preferably from 20–60 parts of the polyester for every 80–40 parts of the styrene. However, since the coarseness of the porosity of various castings varies substantially it is desirable to work within narrower ranges when treating any particular type of porosity. In the table are shown the preferred range of proportions for the types of porosity usually found in iron, aluminum and magnesium castings.

Table

| Type of Casting | Proportions of Components | |
|---|---|---|
| | Polyester Resin | Styrene |
| | Parts | Parts |
| Iron | 45–60 | 55–40 |
| Aluminum | 25–40 | 75–60 |
| Magnesium | 20–35 | 80–65 |

When the sealant mixture is to be stored for substantial periods of time prior to use it is desirable to include an inhibitor, for example 0.25–1.0 part of guaiacol for every 100 parts of the mixture. Other inhibitors may be used, such as, para-quinone, para-tertiary butyl catechol, hydroquinone, orthodinitrophenols, orthotrinitrophenols and the like. A surprising characteristic of the polymerizable compositions of the invention is the inhibitory effect of oxygen on the polymerization. Thus, when stored in containers open to the air or in containers in which air or oxygen is continuously or periodically supplied or in containers having a large proportion of air or oxygen, the compositions remain substantially unpolymerized for long periods of time e. g. several weeks or months whereas when stored in closed containers having a low proportion of free air space or covered with an inert gas such as nitrogen or carbon dioxide, the compositions polymerize to a solid gel in a short time e. g. in a few days, even at room temperatures. This characteristic is valuable in that the compositions or porous metal castings impregnated therewith may be cured while exposed to air or oxygen without forming a skim coating of polymer, i. e. the compositions progressively cure from the inside out.

Due to the rapid rate of polymerization of the polymerizable compositions of this invention it is generally not necessary to include polymerization catalysts. However, when advantageous, polymerization catalysts may be used as, for example, such peroxide catalysts as acetyl peroxide, benzoyl peroxide, lauroyl peroxide and the like. A preferred group of peroxide catalysts comprises long chain aliphatic peroxides e. g. peroxides having an aliphatic chain of 10–20 carbon atoms, such as lauroyl peroxide, stearoyl peroxide and the like, particularly when the metal casting is of a type readily corroded such as magnesium.

In the production of a sealant for porous metal castings the proportion of long chain acids incorporated in the polyester is such that the polyester has a long chain acid residue content in the range 35–65% and preferably, the long chain acid residue content is between 40 and 50%.

In testing the rate of polymerization of sealants, 5–6 cc. of the sealant are placed in a test tube (150 mm. long and 16 mm. in diameter), together with a glass stirring rod. The test tube and contents are heated at 250° F., e. g. in an oil bath, and the rod lifted at 15 second intervals. Polymerization is considered sufficiently advanced when the gel is hard enough for the test tube to be suspended by the stirring rod. Sealants made according to this invention require less than 30 minutes at 250° F. to reach this point, 15–30 minutes usually being required even in the absence of catalysts. This characteristic is a further contribution to the outstanding value of the products of this invention.

Advantageously neutral unsaturated aliphatic hydrocarbons having a molecular weight in the range 150–700 and averaging about two double bonds per molecule may be included in the polymerizable compositions of this invention. Thus, the unsaturated hydrocarbons marketed under the trade-name Orolin may be used. In general, 10–30 parts of the neutral unsaturated aliphatic hydrocarbons may be incorporated with 90–70 parts of the polyesters illustrated by Examples I–IV. Compositions comprising 25–35 parts of such mixtures and 75–65 parts of styrene are especially advantageous as impregnating compositions for such materials as porous magnesium castings. For example, 20 parts of Orolin #1 may be incorporated with 80 parts of the polyesters as illustrated by Examples I–IV and 30 parts of such mixtures incorporated with 70 parts of styrene. The addition of these unsaturated hydrocarbons is particularly valuable in compositions which have a tendency to exude from castings during polymerization and decrease the period required for polymerization under pressure.

Other methods of impregnating porous castings with the compositions of this invention may be used. Thus, the castings may be immersed in a bath of the sealing composition to form a continuous coating and baked after removal from the bath. Another method in the case of hollow castings comprises forcing the sealant into the casting from within the casting and, after removal of excess sealant, heating the casting to polymerize the sealant. Another method comprises suspending the castings in a bath of the sealant under pressure, for example, 10–90 pounds per square inch, followed by removal of excess impregnant and baking.

In carrying out the baking operation, it is preferred that the sealant after application to the casting, be at least initially polymerized under pressure to avoid loss of material by exudation and/or volatilization. The baking conditions given in the above examples may be substantially varied. However, a temperature in the range 100–200° C. is generally preferred. The heating time required to reach the desired degree of polymerization depends on the baking temperature selected and to some extent on the particular formulation used.

An important application of the sealed castings of this invention comprises their use in contact with hydraulic systems whereby loss of fluid contained therein is avoided. Examples of airplane parts requiring effective sealing are supercharger housings, hydraulic system parts, nose sections, gasoline injection system parts and the like.

Other applications for the polymerizable compositions of this invention include polymerization in mass to form flexible, infusible, insoluble castings, coating and/or impregnating various materials such as textiles, paper, wood, metals and the like followed by polymerization in situ, admixture with fillers such as wood flour, cellulosic fibers, mica, rag stock, quartz, asbestos, chlorinated diphenyls, etc., followed by molding under heat and pressure to form valuable molded products.

Suitable other changes and variations may be made in carrying out the invention without departing from the spirit and scope thereof as defined in the appended claims.

What is claimed is:

1. A polymerizable composition for impregnating castings having a porosity corresponding to that in magnesium castings consisting of 65–80 parts of styrene and 35–20 parts of a reaction product of diethylene glycol, maleic acid and linseed oil acids, said polyester resin having an acid number less than 20 and 40–50% thereof being made from linseed oil acids.

2. Porous magnesium castings sealed with the infusible, insoluble product resulting from the polymerization of the product defined in claim 1.

SANFORD E. GLICK.

REFERENCES CITED

The following references are of record in the file of this patent:

UNITED STATES PATENTS

| Number | Name | Date |
|---|---|---|
| 1,772,743 | Barringer | Aug. 12, 1930 |
| 2,195,362 | Ellis | Mar. 26, 1940 |
| 2,255,313 | Ellis | Sept. 9, 1941 |
| 2,305,224 | Patterson | Dec. 15, 1942 |
| 2,407,479 | D'Alelio | Sept. 10, 1946 |

FOREIGN PATENTS

| Number | Country | Date |
|---|---|---|
| 540,169 | Great Britain | Oct. 8, 1941 |

OTHER REFERENCES

India Rubber Journal, July 31, 1943, p. 13.